(12) United States Patent  
Mukae

(10) Patent No.: US 12,234,041 B2  
(45) Date of Patent: Feb. 25, 2025

(54) SATELLITE CONSTELLATION, GROUND FACILITY AND ARTIFICIAL SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 403 days.

(21) Appl. No.: 17/437,416

(22) PCT Filed: Apr. 24, 2019

(86) PCT No.: PCT/JP2019/017433  
§ 371 (c)(1),  
(2) Date: Sep. 9, 2021

(87) PCT Pub. No.: WO2020/217340  
PCT Pub. Date: Oct. 29, 2020

(65) Prior Publication Data  
US 2022/0185505 A1    Jun. 16, 2022

(51) Int. Cl.  
*B64G 1/24* (2006.01)  
*B64G 1/10* (2006.01)

(52) U.S. Cl.  
CPC .......... *B64G 1/242* (2013.01); *B64G 1/1085* (2013.01)

(58) Field of Classification Search  
CPC .... B64G 1/242; B64G 1/1085; B64G 1/1021; B64G 1/1007; B64G 1/244  
See application file for complete search history.

(56) References Cited

U.S. PATENT DOCUMENTS

| | | | | |
|---|---|---|---|---|
| 5,326,054 A | * | 7/1994 | Turner | B64G 1/242 244/158.4 |
| 5,788,187 A | * | 8/1998 | Castiel | B64G 1/1085 342/356 |
| 5,845,206 A | * | 12/1998 | Castiel | H04B 7/195 455/430 |
| 5,961,077 A | * | 10/1999 | Koppel | B64G 1/2427 244/164 |
| 5,979,830 A | | 11/1999 | Kellermeier | |

(Continued)

FOREIGN PATENT DOCUMENTS

EP   0 992 764 A2   4/2000  
JP   10-147296 A    6/1998

(Continued)

OTHER PUBLICATIONS

Office Action issued on Jul. 5, 2022, in corresponding Japanese patent Application No. 2021-515374.

(Continued)

*Primary Examiner* — Medhat Badawi  
*Assistant Examiner* — Vicente Rodriguez  
(74) *Attorney, Agent, or Firm* — XSENSUS LLP

(57) ABSTRACT

A satellite constellation (200) comprises three artificial satellites (210A to 210C) that monitor a target area of the Earth (101). Each artificial satellite circulates on elliptical orbits having sun-synchronization and an orbit inclination angle. A long axis of each elliptical orbit forms an equal angle with each long axis of two adjacent elliptical orbits in a latitude direction.

22 Claims, 20 Drawing Sheets

(56) References Cited

U.S. PATENT DOCUMENTS

| | | | | |
|---|---|---|---|---|
| 6,102,335 | A | * | 8/2000 | Castiel ................ B64G 1/242 |
| | | | | 455/430 |
| 6,241,192 | B1 | | 6/2001 | Kondo et al. |
| 7,720,604 | B1 | * | 5/2010 | Cichan ............... B64G 1/1085 |
| | | | | 701/531 |
| 7,806,369 | B2 | | 10/2010 | Kawaguchi |
| 8,016,240 | B2 | * | 9/2011 | Caplin .................... B64G 1/26 |
| | | | | 455/12.1 |
| 9,977,125 | B2 | | 5/2018 | Di Giorgio et al. |
| 10,531,052 | B2 | * | 1/2020 | Williams, Jr. ....... H04N 23/661 |
| 2003/0222179 | A1 | * | 12/2003 | Peterson ............... B64G 1/242 |
| | | | | 244/158.6 |
| 2008/0029650 | A1 | | 2/2008 | Kawaguchi |
| 2015/0346336 | A1 | | 12/2015 | Di Giorgio et al. |
| 2018/0157930 | A1 | * | 6/2018 | Rutschman .......... B64G 1/1021 |
| 2018/0172823 | A1 | * | 6/2018 | Tyc ..................... G01S 13/9056 |
| 2019/0033891 | A1 | * | 1/2019 | Giraud ................... B64G 1/244 |

FOREIGN PATENT DOCUMENTS

| | | |
|---|---|---|
| JP | 2000-111359 A | 4/2000 |
| JP | 2008-126876 A | 6/2008 |
| JP | 2008-236156 A | 10/2008 |
| JP | 2016-508911 A | 3/2016 |
| WO | 2005/123507 A1 | 12/2005 |

OTHER PUBLICATIONS

Office Action issued on Apr. 5, 2022, in corresponding Japanese patent Application No. 2021-515374, 8 pages.
European Search Report issued Mar. 14, 2022 in European Patent Application 19926631.3.
International Search Report and Written Opinion mailed on Jul. 30, 2019, received for PCT Application PCT/JP2019/017433, Filed on Apr. 24, 2019, 10 pages including English Translation.
Petition to Japan Patent Office for PCT Application PCT/JP2019/017433, Submitted on Mar. 4, 2021, 5 pages including English Translation.
Office Action issued Aug. 7, 2023 in European Patent Application No. 19 926 631.3, 8 pages.
Communication pursuant to Article 94(3) EPC dated Jul. 16, 2024 for the corresponding European application No. 19 926 631.3, 5pp.

* cited by examiner

Fig. 12

| ALTITUDE-FROM-GROUND-SURFACE [Km] | ORBIT INCLINATION ANGLE [deg] | OBSERVATION LATITUDE ZONE [deg] | NUMBER OF CIRCULATIONS [ROUND] | HOUR/ROUND [HOUR] |
|---|---|---|---|---|
| 5144 | 141 | ±38 | 7 | 3.43 |
| 4163 | 125 | ±55 | 8 | 3.00 |
| 3367 | 115 | ±64 | 9 | 2.67 |
| 2706 | 109 | ±70 | 10 | 2.40 |
| 2146 | 105 | ±74 | 11 | 2.18 |
| 1666 | 102 | ±77 | 12 | 2.00 |
| 1248 | 100 | ±79 | 13 | 1.85 |
| 881 | 98 | ±81 | 14 | 1.71 |
| 554 | 97 | ±82 | 15 | 1.60 |

SATELLITE CONSTELLATION, GROUND FACILITY AND ARTIFICIAL SATELLITE

CROSS-REFERENCE TO RELATED APPLICATION

The present application is based on PCT filing PCT/JP2019/017433, filed Apr. 24, 2019, the entire contents of which are incorporated herein by reference.

TECHNICAL FIELD

The present invention relates to a system for monitoring Earth from space.

BACKGROUND ART

An orbit of an artificial satellite is affected by an elliptic effect of Earth (an Earth flattening effect), asymmetry with respect to an equatorial surface of the Earth, and high-order components compared to calculating the Earth as a mass point without a volume. For this reason, an effect such as an orbit surface circling with respect to an inertial space, or the like is generated.

An artificial satellite (geostationary orbit satellite) that circulates on a geostationary orbit flies about 36,000 kilometers above the equator and circulates around the Earth in about a day while synchronizing with a rotation of the Earth. For this reason, the geostationary orbit satellite appears to be stationary in the sky when viewed from a specific point on a ground. That is, it is possible to always monitor the specific point by a monitoring means installed on the geostationary orbit satellite.

Since geostationary orbit satellite flies at about 36,000 kilometers above the equator, monitoring by the geostationary orbit satellite is to be monitoring from a long distance. Further, when monitoring a mid-latitude (for example, near 35 degrees north latitude), monitoring by the geostationary orbit satellite is to be monitoring by viewing from an angle. For this reason, it is difficult to make the monitoring by the geostationary orbit satellite into one with high resolution.

The geostationary orbit satellite has traditionally been put into the geostationary orbit by chemical propulsion. For this reason, it is necessary to install a large amount of propellant on the geostationary orbit satellite, and it has been difficult to install a photographing means having a large aperture and a long focal length on the geostationary orbit satellite.

The chemical propulsion or the electric propulsion is utilized as a propulsion means for an artificial satellite.

For example, in an artificial satellite called a super-low altitude demonstrator, the electric propulsion is utilized. The super-low altitude demonstrator maintains an orbit altitude (about 200 kilometers) where atmospheric resistance cannot be ignored, by accelerating by the electric propulsion, and obtains an effect of monitoring with high resolution.

The super-low altitude demonstrator does not have synchronization with the rotation of the Earth like the geostationary orbit satellite. For this reason, it is impossible to always monitor the specific point by monitoring with the super-low altitude demonstrator.

Patent Literature 1 discloses a system for observing an observation goal area in a short time, after making an observation plan, by using a plurality of observation satellite groups.

The system disclosed in Patent Literature 1 requires a large number of observation satellites. Further, it is difficult to observe the observation goal area by making the large number of observation satellites cooperate with each other.

CITATION LIST

Patent Literature

Patent Literature 1: JP2008-126876A

SUMMARY OF INVENTION

Technical Problem

The present invention aims to facilitate observation of a target area by making a smaller number of artificial satellites cooperate with each other.

Solution to Problem

A satellite constellation according to the present invention includes three or more artificial satellites that monitor a target area of the Earth.

Each of the three or more artificial satellites circulates on elliptical orbits having sun-synchronization and an orbit inclination angle.

A long axis of each elliptical orbit forms an equal angle with each long axis of two adjacent elliptical orbits on an orbit surface.

Advantageous Effects of Invention

According to the present invention, observation of a target area by making three artificial satellites cooperate with each other is facilitated.

BRIEF DESCRIPTION OF DRAWINGS

FIG. 12 is a table illustrating specific examples of sun-synchronous circular orbits regarding the artificial satellite 210 according to the first embodiment;

DESCRIPTION OF EMBODIMENTS

Figure 1:
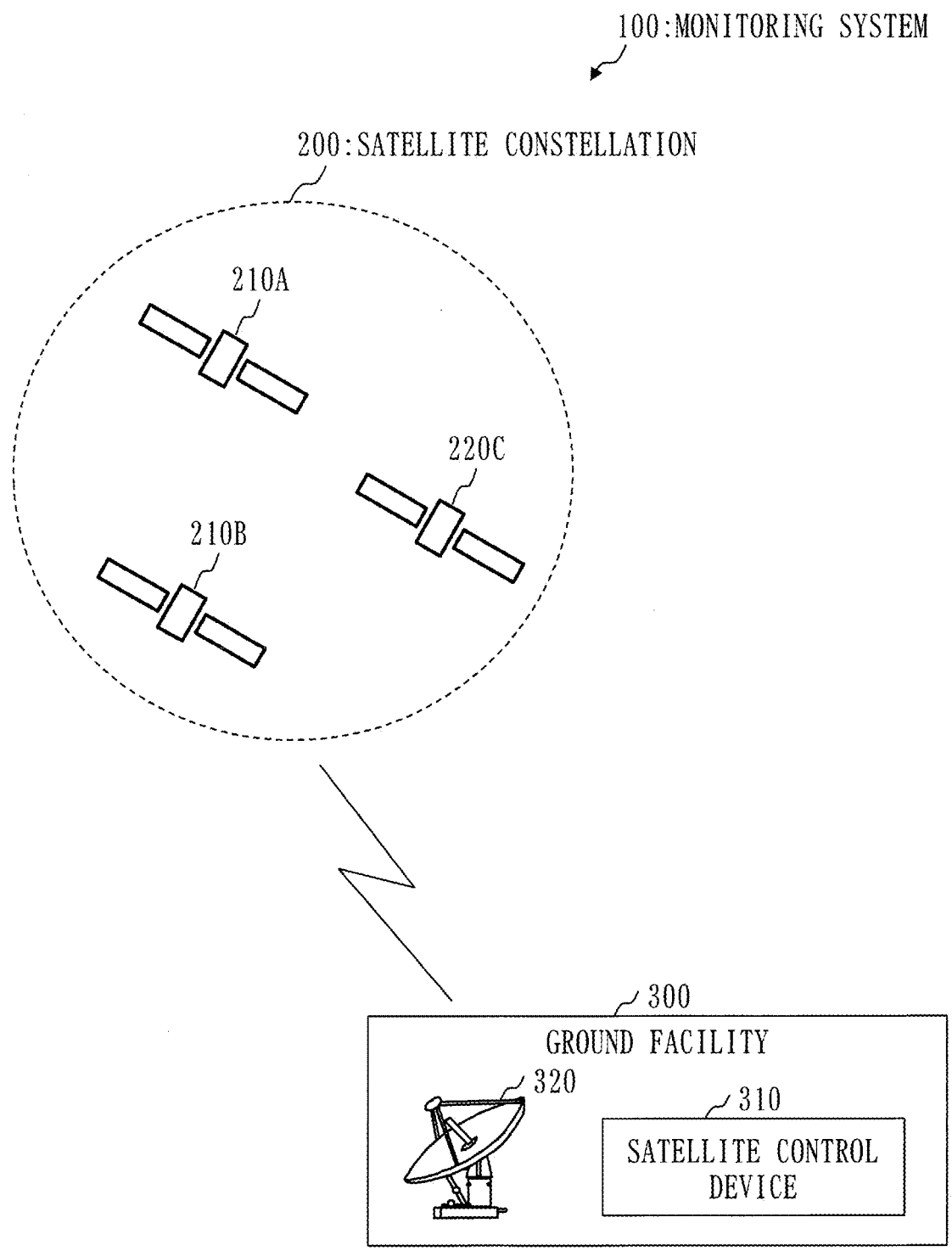
FIG. 1 is a configuration diagram of a monitoring system 100 according to a first embodiment.

In embodiments and the drawings, the same or corresponding elements are designated by the same reference numerals. Descriptions of the elements designated by the same reference numerals as the described elements will be omitted or simplified as appropriate.

First Embodiment

A satellite constellation 200 will be described with reference to FIGS. 1 to 12.

A configuration of a monitoring system 100 will be described with reference to FIG. 1.

The monitoring system 100 is a system for monitoring a target area of the Earth, and includes the satellite constellation 200 and a ground facility 300.

"Monitoring" may be read as "observing".

The satellite constellation 200 is constituted of three or more artificial satellites 210.

In the present embodiment, the satellite constellation 200 is a three-in constellation constituted of three artificial satellites (210A to 210C).

However, the satellite constellation 200 may be constituted of four or more artificial satellites 210.

The three artificial satellites (210A to 210C) cooperate with each other to monitor the target area of the Earth.

The ground facility 300 includes a satellite control device 310 and a satellite communication device 320, and controls the satellite constellation 200 by communicating with each artificial satellite 210.

The satellite control device 310 is a computer that generates each type of command for controlling each artificial satellite (210A to 210C), and the satellite control device 310 includes pieces of hardware such as processing circuitry and an input and output interface. The processing circuitry generates each type of command. An input device and an output device are connected to the input and output interface. The satellite control device 310 is connected to the satellite communication device 320 via the input and output interface.

The satellite communication device 320 communicates with each artificial satellite (210A to 210C). Specifically, the satellite communication device 320 transmits each type of command to each artificial satellite (210A to 210C). Further, the satellite communication device 320 receives monitor data transmitted from each artificial satellite (210A to 210C).

Figure 2:
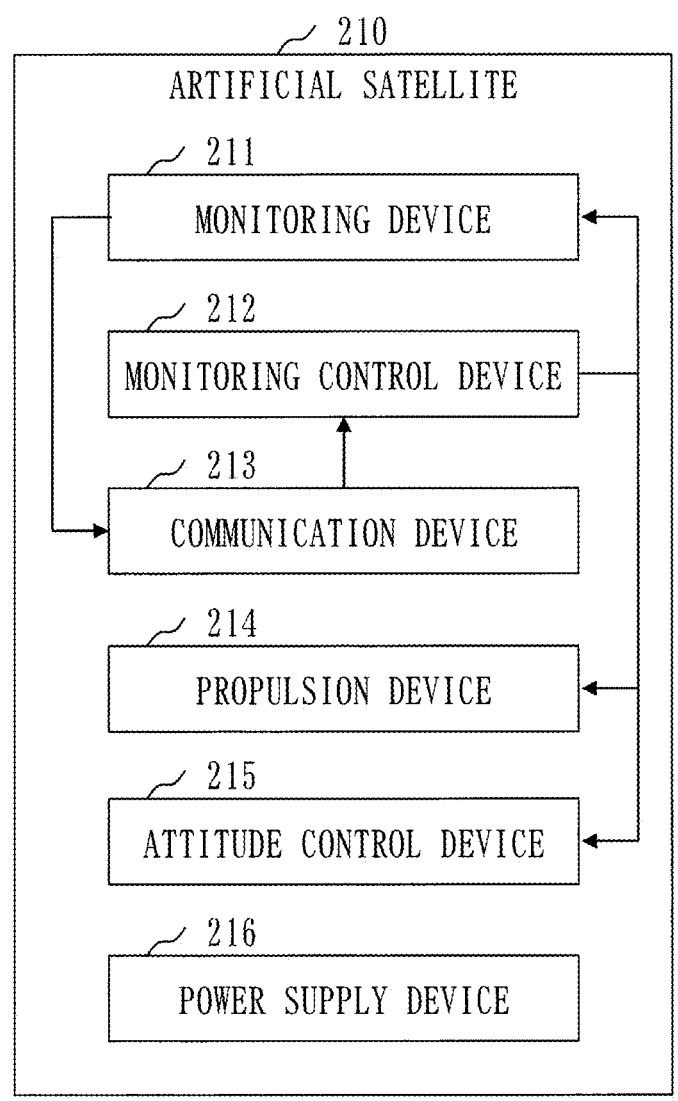
FIG. 2 is a configuration diagram of an artificial satellite 210 according to the first embodiment.

A configuration of the artificial satellite 210 will be described with reference to FIG. 2. Each artificial satellite (210A to 210B) is constituted as follows.

The artificial satellite 210 includes a monitoring device 211, a monitoring control device 212, a communication device 213, a propulsion device 214, an attitude control device 215, and a power supply device 216.

The monitoring device 211 is a device for monitoring the target area of the Earth. For example, the monitoring device 211 is a visible optical sensor, an infrared optical sensor, or a synthetic aperture radar (SAR). The monitoring device 211 generates the monitor data. The monitor data is data equivalent to an image showing the target area of the Earth.

The monitoring control device 212 is a computer that controls the monitoring device 211, the propulsion device 214, and the attitude control device 215, and the monitoring control device 212 includes the processing circuitry. Specifically, the monitoring control device 212 controls the monitoring control device 212, the propulsion device 214, and the attitude control device 215 according to each type of command transmitted from the ground facility 300.

The communication device 213 is a device that communicates with the ground facility 300. Specifically, the communication device 213 transmits the monitor data to the ground facility 300. Further, the communication device 213 receives each type of command which is transmitted from the ground facility 300.

The propulsion device 214 is a device that provides a propulsive force to the artificial satellite 210, and the propulsion device 214 changes speed of the artificial satellite 210. Specifically, the propulsion device 214 is an electric propulsion machine. For example, the propulsion device 214 is an ion engine or a Hall thruster.

The attitude control device 215 is a device for controlling attitude elements such as attitude of the artificial satellite 210, angular velocity of the artificial satellite 210, and a line-of-sight direction (Line Of Sight) of the monitoring device 211. The attitude control device 215 changes each attitude element in a desired direction.

Alternatively, the attitude control device 215 maintains each attitude element in the desired direction. The attitude control device 215 includes an attitude sensor, an actuator, and a controller. The attitude sensor is a gyroscope, an Earth sensor, a sun sensor, a star tracker, a thruster, a magnetic sensor, or the like. The actuator is an attitude control thruster, a momentum wheel, a reaction wheel, a control moment gyro, or the like. The controller controls the actuator according to measurement data of the attitude sensor or each type of command from the ground facility 300.

The power supply device 216 includes a solar cell, a battery, a power control device, and the like, and supplies power to each equipment installed on the artificial satellite 210.

The processing circuitry included in each of the satellite control device 310 and the monitoring control device 212 will be described.

The processing circuitry may be dedicated hardware or a processor that executes a program stored in a memory.

In the processing circuitry, a part of functions may be realized by dedicated hardware, and the remaining functions may be realized by software or firmware. That is, the processing circuitry can be realized by hardware, software, firmware, or a combination of these.

Dedicated hardware is, for example, a single circuit, a composite circuit, a programmed processor, a parallel programmed processor, an ASIC, an FPGA, or a combination of these.

ASIC is an abbreviation for Application Specific Integrated Circuit.

FPGA is an abbreviation for Field Programmable Gate Array.

A pointing function of the artificial satellite 210 will be described.

The artificial satellite 210 includes a pointing function for directing a monitoring direction to the target area.

For example, the artificial satellite 210 includes a reaction wheel. The reaction wheel is a device for controlling the attitude of the artificial satellite 210. Body pointing is realized by controlling the attitude of the artificial satellite 210 by the reaction wheel.

For example, the monitoring device 211 includes a pointing mechanism. The pointing mechanism is a mechanism for changing the line-of-sight direction of the monitoring device 211. For example, a drive mirror or the like is used as the pointing mechanism.

A monitoring function of the monitoring device 211 will be described.

The monitoring device 211 has a resolution variable function and an autofocus function.

The resolution variable function is a function for changing resolution of the monitor data.

The autofocus function is a function for setting a focal point to the monitoring target.

The satellite constellation 200 will be described with reference to FIGS. 3 to 7.

Figure 3:
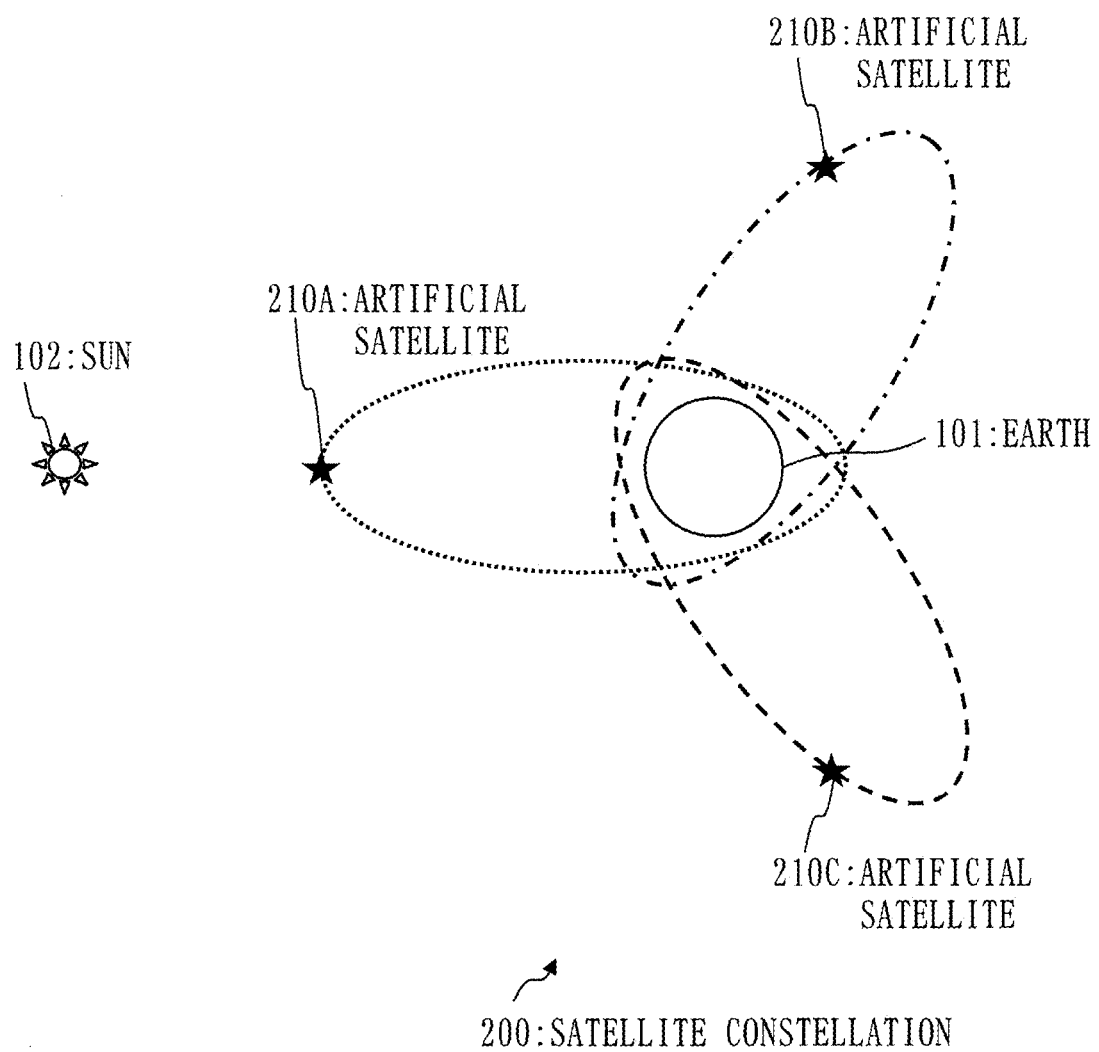
FIG. 3 is a configuration diagram of a satellite constellation 200 according to the first embodiment.

FIG. 3 illustrates the satellite constellation 200 when viewed in a normal line direction of an orbit surface 103.

Figure 4:
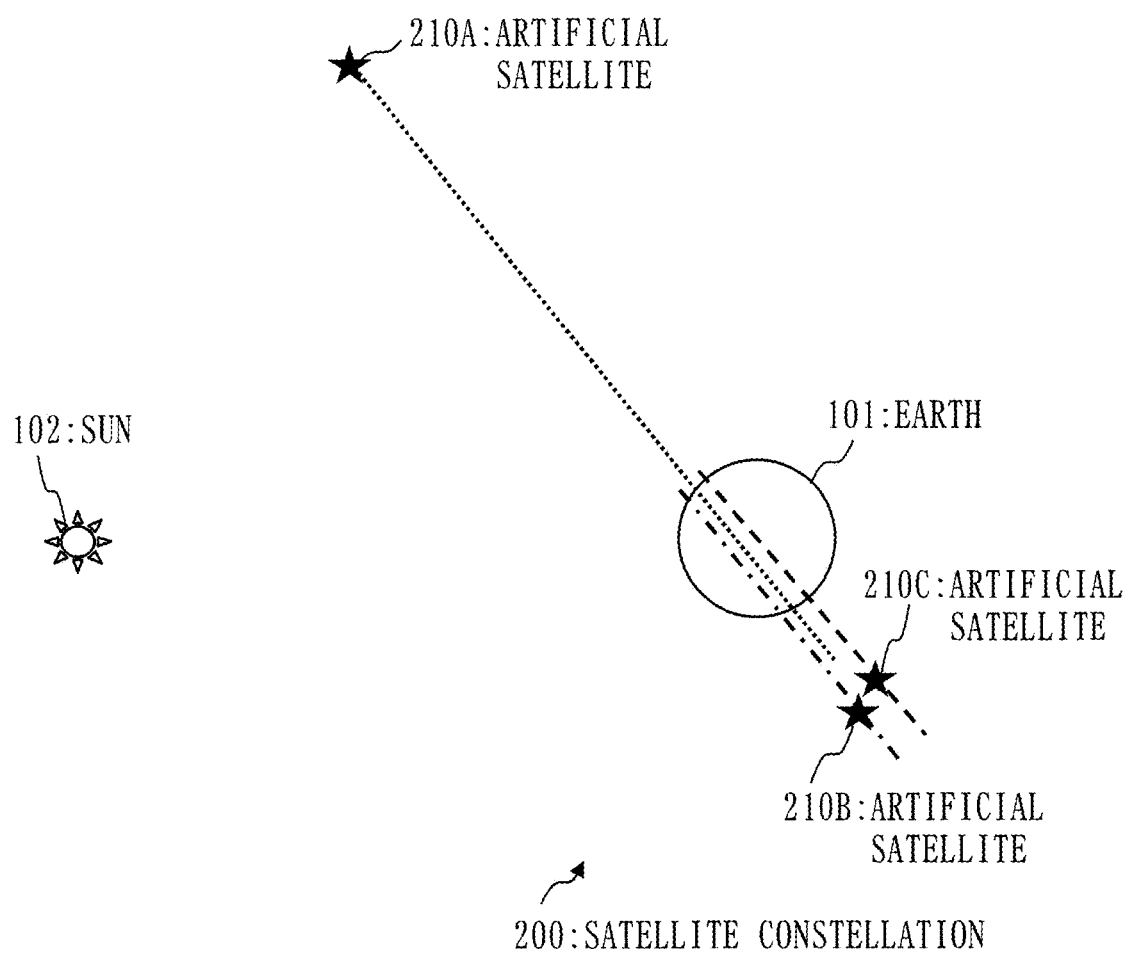
FIG. 4 is a configuration diagram of the satellite constellation 200 according to the first embodiment.

FIG. 4 illustrates the satellite constellation 200 when viewed from the orbit surface 103. For example, FIG. 4 illustrates the satellite constellation 200 when viewed from the sky above the equator.

Figure 5:
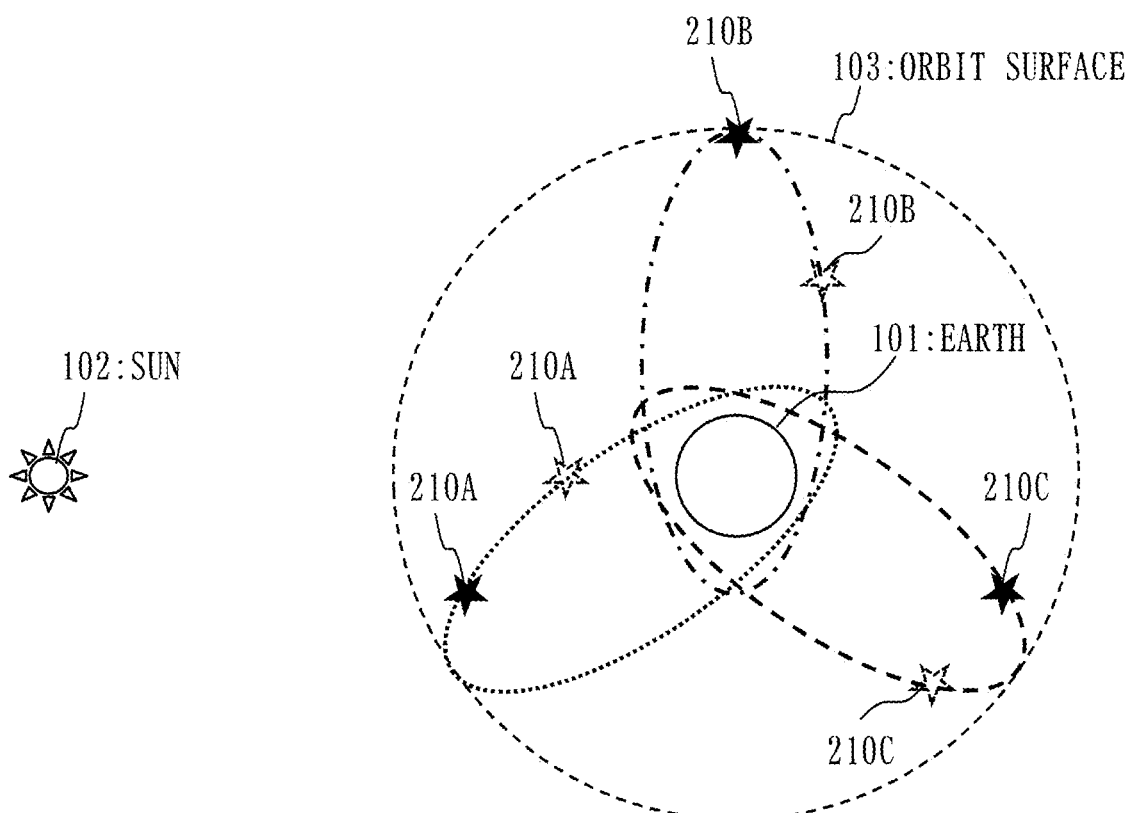
FIG. 5 is a diagram illustrating a movement of the satellite constellation 200 according to the first embodiment.
Figure 6:
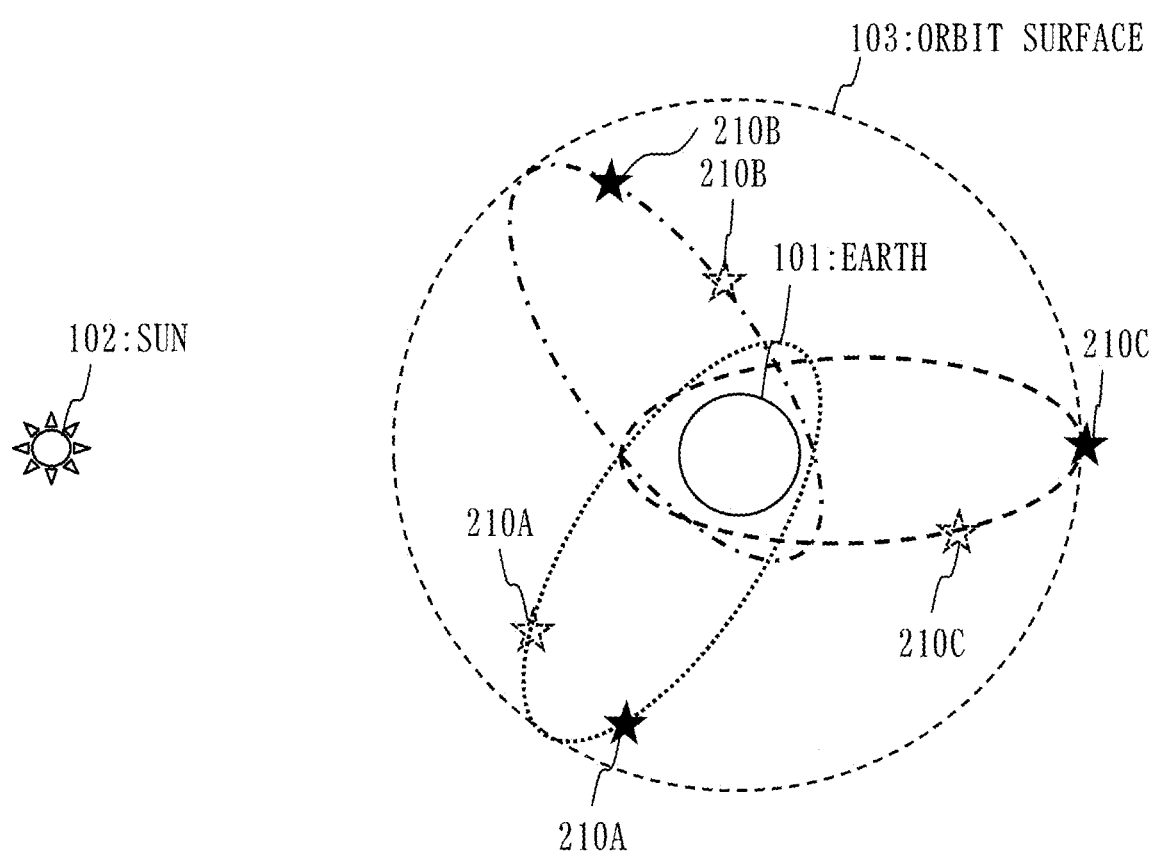
FIG. 6 is a diagram illustrating a movement of the satellite constellation 200 according to the first embodiment.
Figure 7:
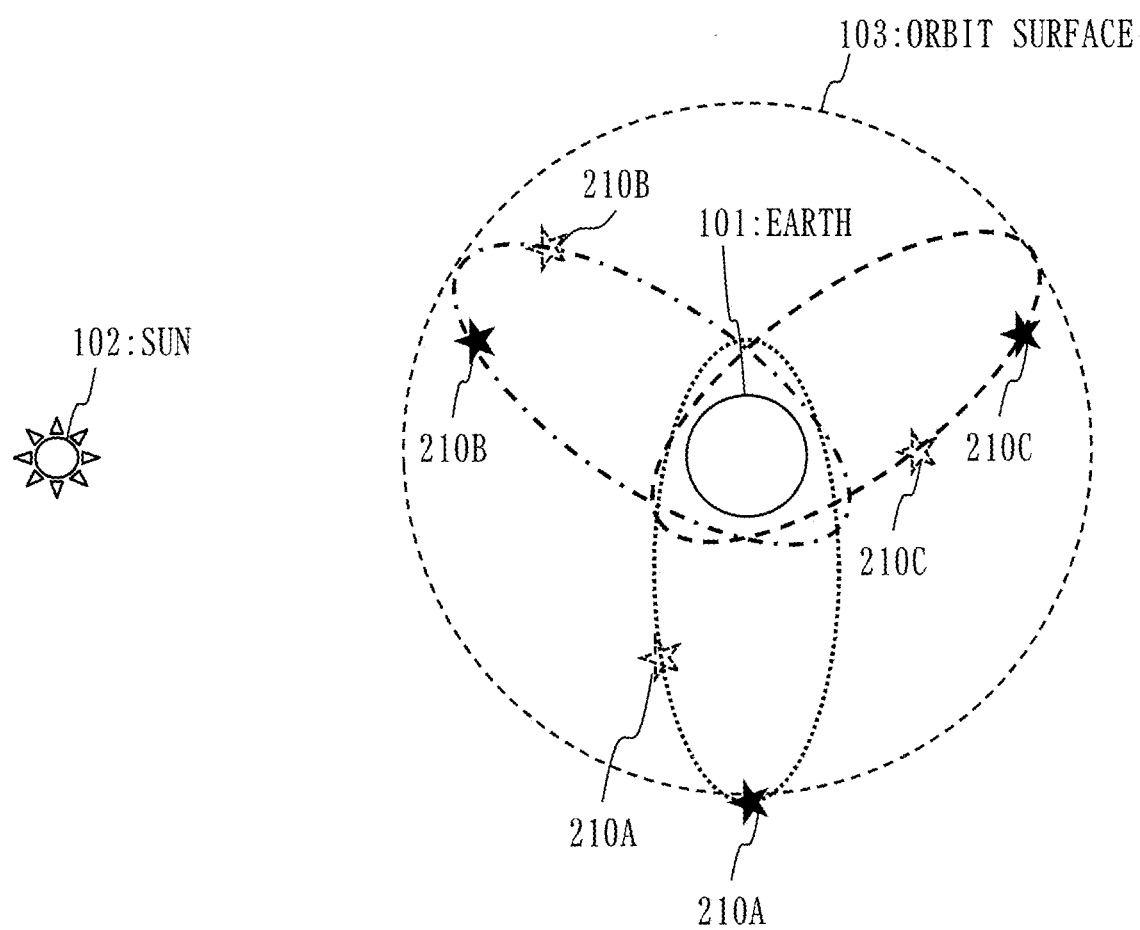
FIG. 7 is a diagram illustrating a movement of the satellite constellation 200 according to the first embodiment.

FIGS. 5, 6 and 7 illustrate a long axis of an elliptical orbit of each artificial satellite (210A to 210C) circling centering on Earth 101 along the orbit surface 103. The orbit surface 103 is a surface along which the elliptical orbit of each artificial satellite (210A to 210C) is arranged.

Each artificial satellite (210A-210C) circulates on a sun-synchronous elliptical orbit. Each elliptical orbit has a high eccentricity and an orbit inclination angle. That is, the orbit of each artificial satellite (210A to 210C) is a sun-synchronous orbit, also an inclined orbit, and also the elliptical orbit.

Monitoring of the Northern Hemisphere during a daytime is maintained by the three artificial satellites (210A-210C).

The elliptical orbit of each artificial satellite (210A to 210C) is a non-frozen orbit.

That is, the elliptical orbit of each artificial satellite (210A to 210C) is not a frozen orbit, and the long axis of each elliptical orbit circles centering on the Earth 101 inside the orbit surface 103 over time.

The three artificial satellites (210A to 210C) alternately monitor the target area of the Earth 101 from a perigee, an apogee, or a midpoint. The midpoint is a point located between the perigee and the apogee.

At the perigee, it is possible to monitor with high resolution but for a short time.

At the apogee, it is possible to monitor for a long time but with low resolution.

Each long axis of three elliptical orbits is inclined at equal intervals of about 120° in a circumferential direction of the orbit surface. An azimuth direction is equivalent to a longitude direction, that is, an east-west direction.

The long axis of each elliptical orbit circles based on the Earth 101, but a relative relationship between the three elliptical orbits is maintained.

The normal line direction of the orbit surface 103 is maintained.

For this reason, a sun incident angle is maintained relative to each artificial satellite (210A to 210C).

At 12:00 pm, a phase of each artificial satellite (210A-210C) is not correlated with the latitude of the target area of the Earth 101. A phase of the artificial satellite 210 is equivalent to a position of the artificial satellite 210 on the orbit of the artificial satellite 210.

One of the three artificial satellites (210A to 210C) can monitor the target area of the Earth 101.

Therefore, it is possible to monitor the target area almost continuously.

When the artificial satellite 210 passes in the sky above the target area of the Earth 101 on an apogee side of the elliptical orbit, the artificial satellite 210 monitors the target area of the Earth 101 for a long time but with low resolution.

When the artificial satellite 210 passes in the sky above the target area of the Earth 101 on a perigee side of the elliptical orbit, the artificial satellite 210 monitors the target area of the Earth 101 with high resolution but for a short time.

A specific example of the elliptical orbit of each artificial satellite (210A to 210C) is as follows. However, the following values are approximate values.

An altitude of the circular orbit, which is a basis of the elliptical orbit, is 5,100 kilometers.

An eccentricity of the elliptical orbit is 0.418.

An orbit inclination angle is 122 degrees.

An apogee altitude is 9,898 kilometers.

A perigee altitude is 302 kilometers.

The relationship between the altitude and the latitude of the elliptical orbit of each artificial satellite (210A to 210C) will be described with reference to FIG. 8.

A dotted line represents the elliptical orbit of the artificial satellite 210A. An alternate long and short dash line represents the elliptical orbit of the artificial satellite 210B. A broken line represents the elliptical orbit of the artificial satellite 210C.

"Ha" is the perigee altitude, and "Hc" is an all-time-perigee usage altitude. The all-time-perigee usage altitude is an altitude at which the target area can be monitored from the perigee side by at least one of the three artificial satellites (210A to 210C).

"Hb" is the apogee altitude, and "Hd" is the always-apogee usage altitude. The always-apogee usage altitude is an altitude at which the target area can be monitored from the apogee side by at least one of the three artificial satellites (210A to 210C).

Figure 8:
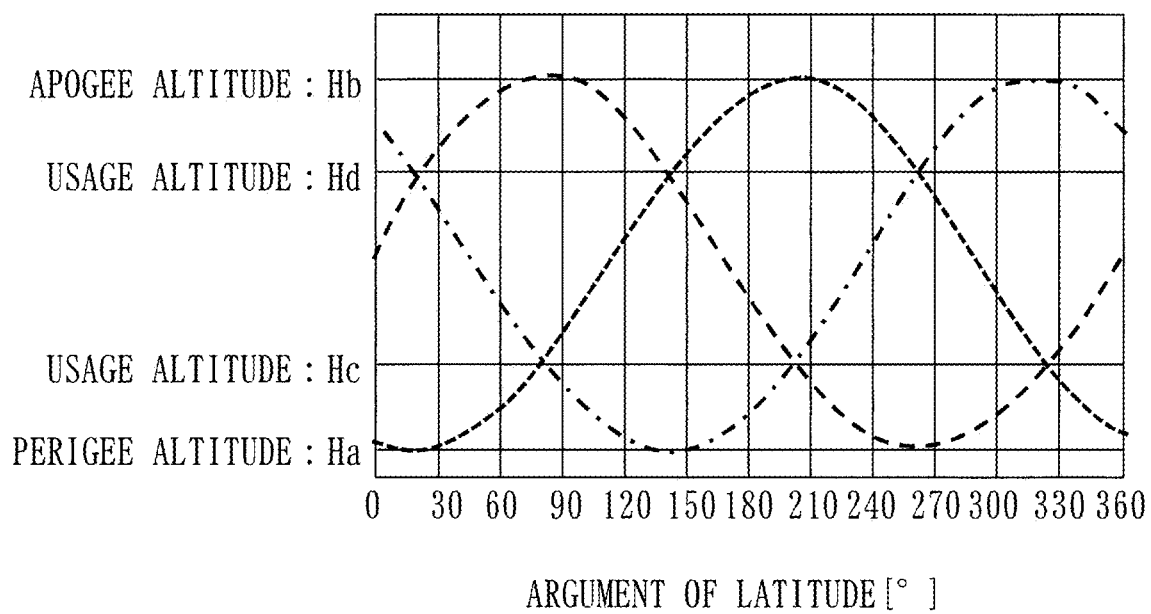
FIG. 8 is a graph illustrating a relationship between altitude and latitude of an elliptical orbit of each artificial satellite (210A to 210C) according to the first embodiment.

Each usage altitude (Hd, Hc) is equivalent to an altitude of an intersection of two elliptical orbits in a graph of FIG. 8.

A length of time that the artificial satellite 210 stays in the sky above the target area is referred to as staying time of the artificial satellite 210.

On the apogee side, the staying time of each artificial satellite (210A to 210C) is long, and a field of view of each artificial satellite (210A to 210C) is wide.

The satellite control device 310 sets each of the usage altitude Hb and a viewing angle of the monitoring device 211 so that the target area fits within the field of view while each artificial satellite (210A to 210C) flies at an altitude higher than the usage altitude Hd. Consequently, always monitoring the target area is possible.

Since a passage time of each artificial satellite (210A to 210C) is short on the perigee side, monitoring from the perigee side does not have all-time characteristics. However, no matter what latitude the target area is at, at least one of the artificial satellites (210A to 210C) can monitor the target area from an altitude lower than the usage altitude Hc.

The satellite control device 310 sets resolution of the monitoring device 211 so that a desired resolution can be achieved at the usage altitude Hc. Consequently, monitoring the target area with high resolution is possible.

Adjustments of a satellite altitude and the orbit inclination angle will be described with reference to FIGS. 9 and 10.

The long axis of the elliptical orbit of the artificial satellite 210 is correlated with the satellite altitude. For this reason, by finely adjusting the altitude of each artificial satellite (210A to 210C), a relative angle of the elliptical orbit when viewed from the normal line direction of the orbit surface can be maintained. A condition of the satellite altitude for maintaining the relative angle of the elliptical orbit is referred to as an "altitude condition".

Sun-synchronization of the elliptical orbit is realized by a correlation between the satellite altitude and the orbit inclination angle. For this reason, by finely adjusting the orbit inclination angle of each artificial satellite (210A to 210C), the sun-synchronization of the elliptical orbit can be maintained. A condition of the orbit inclination angle for maintaining the sun-synchronization is referred to as an "inclination angle condition".

Therefore, by realizing both the altitude condition and the inclination angle condition, it is possible to run the satellite constellation 200 while the relative angle of the elliptical orbit is maintained and while the sun-synchronization of the elliptical orbit is maintained.

The satellite control device 310 generates a command for adjusting the altitude of each artificial satellite (210A to 210C). Further, the satellite control device 310 generates a command for adjusting the orbit inclination angle of each artificial satellite (210A to 210C). Then, the satellite communication device 320 transmits these commands to each artificial satellite (210A to 210C).

For each artificial satellite (210A to 210C), the monitoring control device 212 adjusts the satellite altitude and the orbit inclination angle according to these commands. Specifically, the monitoring control device 212 controls the propulsion device 214 according to these commands. The propulsion device 214 can adjust the satellite altitude and the orbit inclination angle by changing satellite speed.

Figure 9:
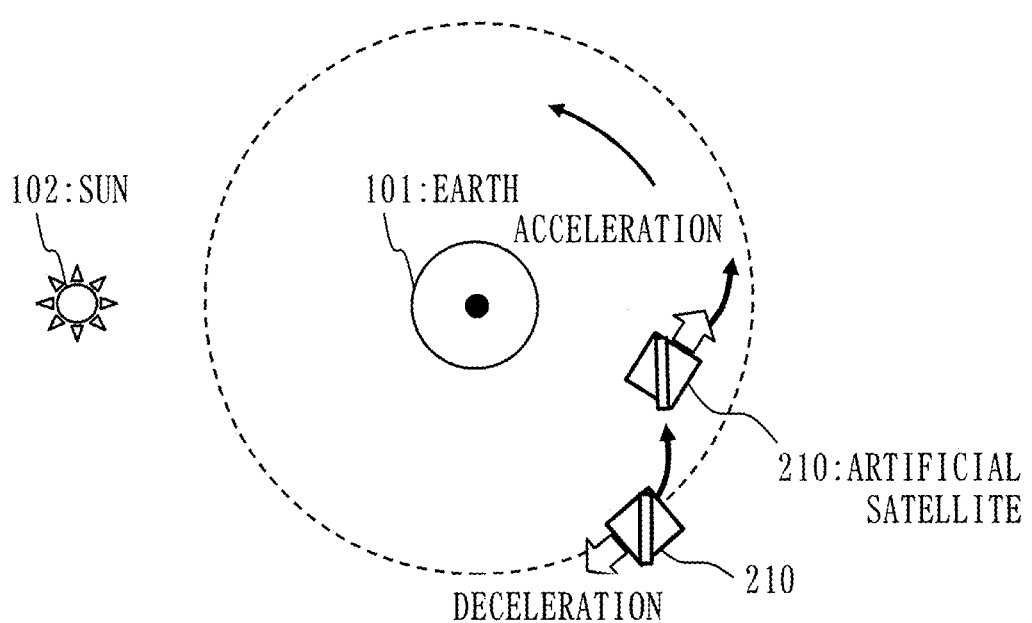
FIG. 9 is a diagram illustrating a relationship between speed and altitude of the artificial satellite 210 according to the first embodiment.

In FIG. 9, a black circle depicted inside the Earth 101 represents the North Pole.

When flight speed of the artificial satellite 210 accelerates, the altitude of the artificial satellite 210 rises. Then, when the altitude of the artificial satellite 210 rises, ground speed of the artificial satellite 210 decelerates.

When the flight speed of the artificial satellite 210 decelerates, the altitude of the artificial satellite 210 lowers. Then, when the altitude of the artificial satellite 210 lowers, the ground speed of the artificial satellite 210 accelerates.

Figure 10:
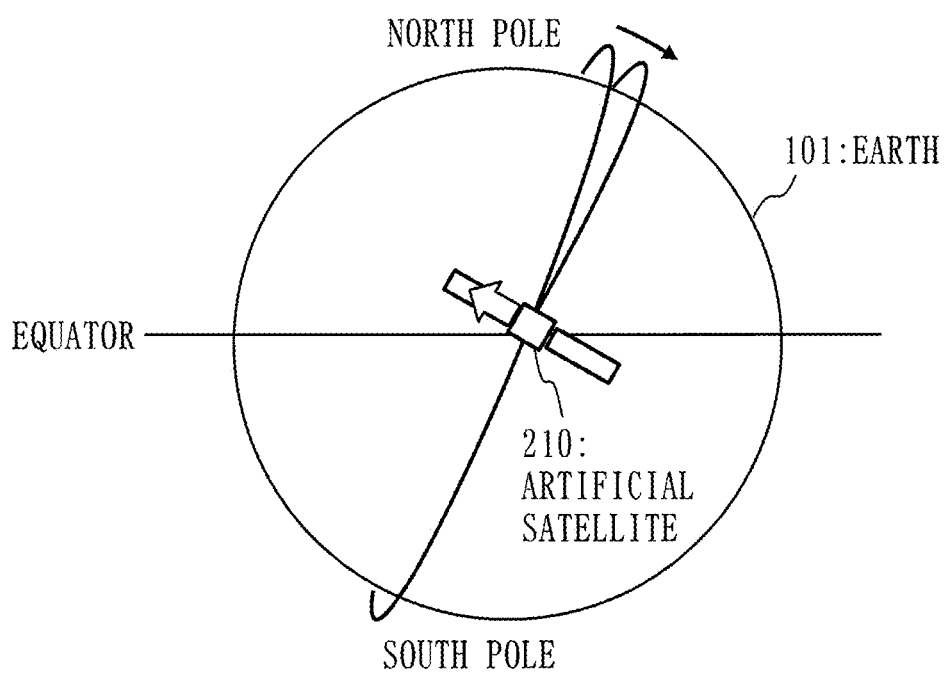
FIG. 10 is a diagram illustrating adjustment of an orbit inclination angle according to the first embodiment.

As illustrated in FIG. 10, if the propulsion device 214 generates thrust in a direction orthogonal to the orbit surface at a point (equinox) where the artificial satellite 210 crosses in the sky above the equator, the orbit inclination angle can be finely adjusted effectively.

With rotation of the Earth 101, the target area moves independently of the orbit surface of each artificial satellite (210A to 210C). Further, each artificial satellite (210A to 210C) flies on the elliptical orbit regardless of movement of the target area.

For this reason, even if both the altitude condition and the inclination angle condition are satisfied, the three artificial satellites (210A to 210C) are not necessarily able to cooperate with each other in a timely manner to constantly monitor the target area.

By accelerating or decelerating each artificial satellite (210A to 210C) in the orbit surface, the three artificial satellites (210A to 210C) can cooperate with each other in a timely manner to constantly monitor the target area.

Then, the satellite control device 310 generates a command for accelerating or decelerating each artificial satellite (210A to 210C) in the orbit surface. Then, the satellite communication device 320 transmits the generated command to each artificial satellite (210A to 210C).

After that, the satellite control device 310 generates the commands for adjusting the satellite altitude and the orbit inclination angle of each artificial satellite (210A to 210C). Then, the satellite communication device 320 transmits the generated commands to each artificial satellite (210A to 210C).

Consequently, optimally adjusting a monitoring condition in a short term and maintaining the relative relationship of the elliptical orbit of each artificial satellite (210A to 210C) in a long term are possible.

A position of the target area and a position of each artificial satellite (210A to 210C) can be managed by using a common coordinate system. Then, by using the common coordinate system, each artificial satellite (210A to 210C) can be controlled according to the position of the target area.

A specific example of the common coordinate system is an Earth fixed coordinate system. The Earth fixed coordinate system is a coordinate system adopted by the Quasi-Zenith Positioning Satellite of Japan and the GPS of the United States.

GPS is an abbreviation for Global Positioning System.

The satellite control device 310 can calculate an optimum pointing condition for orienting the direction to the target area in consideration of a satellite attitude condition in an inertial space.

The satellite control device 310 generates a command indicating the optimum pointing condition for each artificial satellite (210A to 210C). Then, the satellite communication device 320 transmits the generated command to each artificial satellite (210A to 210C).

The monitoring control device 212 controls the pointing function of the artificial satellite 210 according to the command from the ground facility 300.

The monitoring control device 212 may control the attitude control device 215, or control the pointing mechanism of the monitoring device 211.

For monitoring the target area, it is effective to shorten a relative distance between the target area and each artificial satellite (210A to 210C). Further, it is effective to image under a condition in which a solar altitude is high, that is, to image under a condition in which there is bright.

Hence, the satellite control device 310 generates a command for adjusting a flight position of each artificial satellite (210A to 210C). Then, the satellite communication device 320 transmits the generated command to each artificial satellite (210A to 210C).

After that, the satellite control device 310 generates commands for adjusting the satellite altitude and the orbit inclination angle of each artificial satellite (210A to 210C). Then, the satellite communication device 320 transmits the generated commands to each artificial satellite (210A to 210C).

Consequently, optimally adjusting the monitoring condition in a short term and maintaining the relative relationship of the elliptical orbit of each artificial satellite (210A to 210C) in a long term are possible.

Figure 11:
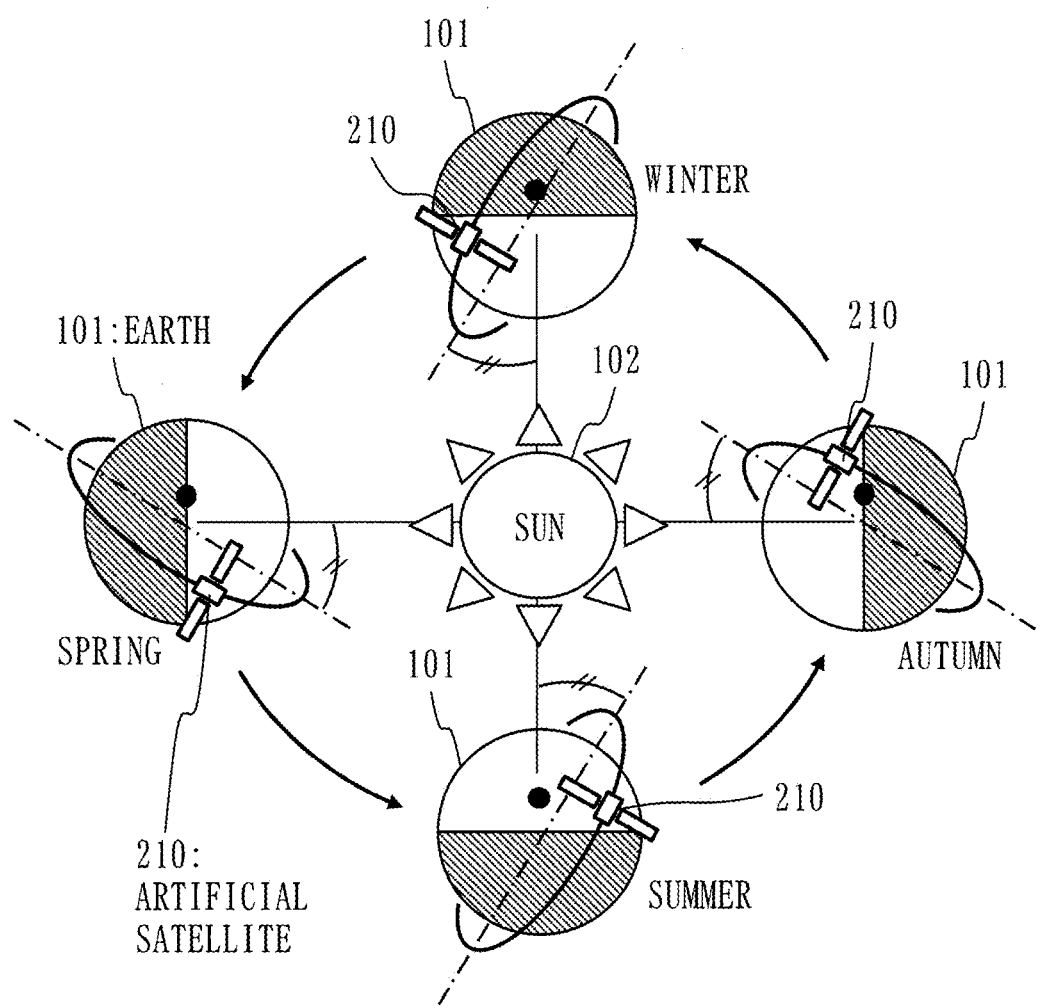
FIG. 11 is a diagram illustrating a sun-synchronous orbit regarding the artificial satellite 210 according to the first embodiment.

The sun-synchronous orbit will be described with reference to FIG. 11. A black circle depicted in the Earth 101 represents the North Pole. A line depicted through a center of the Earth 101 represents the equator.

The sun-synchronous orbit is an orbit in which the sun incident angle is maintained. That is, when the orbit of the artificial satellite 210 is the sun-synchronous orbit, the sun incident angle relative to the orbit surface of the artificial satellite 210 does not change throughout a year.

A sun-synchronous circular orbit will be described with reference to FIG. 12.

The sun-synchronous circular orbit is a sun-synchronous orbit, also a circular orbit, and also an inclined orbit.

In the sun-synchronous circular orbit, an adoptable range of the orbit altitude is from about 500 kilometers to about 5,700 kilometers. At about 500 kilometers or lower, since effect of atmospheric resistance cannot be ignored, the sun-synchronization cannot be maintained. At about 5,700 kilometers or higher, since the circling of the orbit surface due to effect of an Earth ellipsoid reaches a limit, the sun-synchronization cannot be maintained.

FIG. 12 illustrates attribute values of the circular orbit at which the number of circulations of the artificial satellite 210 in a day is an integer. Each attribute value is an approximate value. That is, each numerical value indicated in FIG. 12 is an approximate number including a rounding error.

The attribute values of the circular orbit illustrated in FIG. 12 are examples of the attribute values for realizing the sun-synchronization. The number of circulations of the artificial satellite 210 in a day is not necessary an integer, and there exist many attribute values of the circular orbit for satisfying the sun-synchronization.

The eccentricity of the circular orbit is zero, and when the eccentricity is changed, the circular orbit becomes the elliptical orbit.

The sun-synchronous elliptical orbit largely depends on an orbit long axis length. Specifically, twice a radius of the sun-synchronous circular orbit is a rough standard for the orbit long axis length.

The radius of the sun-synchronous circular orbit, that is, a distance from the center of the Earth to the sun-synchronous circular orbit, is calculated by adding the radius of the Earth to an altitude-from-ground-surface of the circular orbit. The radius of the Earth is about 6,378 kilometers.

The radius of the sun-synchronous circular orbit required for making the artificial satellite 210 circulate seven rounds in a day is about 11,522 kilometers. This radius is calculated by adding the radius (about 6,378 kilometers) of the Earth to the altitude-from-ground-surface (about 5,144 kilometers) of the circular orbit. Therefore, the long axis length of the sun-synchronous elliptical orbit required for making the artificial satellite 210 circulate seven rounds in a day is about 23,000 kilometers. This long axis length is calculated by doubling the radius (about 11,522 kilometers) of the sun-synchronous circular orbit.

The long axis length of the elliptical orbit depends on the apogee altitude and the perigee altitude. A ratio of the apogee altitude and the perigee altitude can be anything. For example, when the apogee altitude is about 10,000 kilometers and the perigee altitude is about 300 kilometers, the long axis length of the elliptical orbit is the above length (about 23,000 kilometers).

That is, by changing the eccentricity and finely adjusting parameters such as the apogee altitude and the perigee altitude, it is possible to find the sun-synchronous elliptical orbit required for making the artificial satellite 210 circulate seven rounds in a day.

The sun-synchronous elliptical orbit for seven rounds has the orbit inclination angle of about 140 degrees. That is, the apogee and the perigee are located in the sky at a latitude of plus or minus 40 degrees (=180-140). For this reason, this elliptical orbit is suitable for monitoring Japan located at a latitude of about 40 degrees.

Similarly, for the number of circulations other than the seven rounds, the sun-synchronous elliptical orbit can be obtained.

That is, by changing the eccentricity and finely adjusting the parameters such as the apogee altitude and the perigee altitude, it is possible to find the sun-synchronous elliptical orbit for any number of circulations.

Characteristics of First Embodiment

Main characteristics of the first embodiment will be described.

The satellite constellation 200 includes three or more artificial satellites 210 that monitor the target area of the Earth.

Each of the three or more artificial satellites 210 circulates on the elliptical orbit having the sun-synchronization and the orbit inclination angle.

The long axis of each elliptical orbit is tilted at equal intervals of about 120° along a circumferential direction of the orbit surface. That is, the long axis of each elliptical orbit forms an equal angle with each long axis of two adjacent elliptical orbits on the orbit surface.

The ground facility 300 includes the satellite control device 310 and the satellite communication device 320, and controls the satellite constellation 200.

The satellite control device 310 generates adjustment commands for each artificial satellite 210 of the satellite constellation 200. The adjustment commands are commands for adjusting the altitude of the artificial satellite 210 and the orbit inclination angle of the elliptical orbit of the artificial satellite 210.

The satellite communication device 320 transmits the generated adjustment commands to the artificial satellite 210 for each artificial satellite 210 of the satellite constellation 200.

For each artificial satellite 210 of the satellite constellation 200, the altitude of the artificial satellite 210 and the orbit inclination angle of the elliptical orbit of the artificial satellite 210 are adjusted according to the adjustment commands. Consequently, the sun-synchronization of the elliptical orbit of each artificial satellite 210 is maintained, and also, relative angles between the long axis of the elliptical orbit of each artificial satellite 210 and the long axes of the elliptical orbits of the other artificial satellites 210 are maintained.

The satellite control device 310 generates a control command for controlling the propulsion device of the artificial satellite 210 for each artificial satellite 210 of the satellite constellation 200. The control command is a command for adjusting the position of the artificial satellite 210 on the elliptical orbit of the artificial satellite 210.

The satellite communication device 320 transmits the generated control command to the artificial satellite 210 for each artificial satellite 210 of the satellite constellation 200.

For each artificial satellite 210 of the satellite constellation 200, the position of the artificial satellite 210 on the elliptical orbit of the artificial satellite 210 is adjusted according to the control command. Consequently, each artificial satellite 210 cooperate with the other artificial satellites 210 to constantly monitor the target area.

For each artificial satellite 210 of the satellite constellation 200, the adjustment commands are executed after the control command is executed.

Further, the satellite control device 310 generates for each artificial satellite 210 of the satellite constellation 200, the control command for controlling the propulsion device of the artificial satellite 210. The control command is a command for adjusting the speed of the artificial satellite 210.

The satellite communication device 320 transmits the generated control command to the artificial satellite 210 for each artificial satellite 210 of the satellite constellation 200.

For each artificial satellite 210 of the satellite constellation 200, the speed of the artificial satellite 210 is adjusted according to the control command. Consequently, a relative position of the artificial satellite 210 towards the target area of the Earth is adjusted during a target time range assigned to the artificial satellite 210.

For each artificial satellite 210 of the satellite constellation 200, the adjustment commands are executed after the control command is executed.

The target time range is a time range in which the target area is monitored.

Each artificial satellite 210 of the satellite constellation 200 has the pointing function for changing the monitoring direction.

The satellite control device 310 generates a pointing command for each artificial satellite 210 of the satellite constellation 200. The pointing command is a command for controlling the pointing function of the artificial satellite 210.

The satellite communication device 320 transmits the generated pointing command to the artificial satellite 210 for each artificial satellite 210 of the satellite constellation 200.

For each artificial satellite 210 of the satellite constellation 200, the pointing function of the artificial satellite 210 is controlled according to the pointing command. Consequently, the monitoring direction of the artificial satellite 210 is directed to the target area of the Earth during the target time range assigned to the artificial satellite 210.

Each artificial satellite 210 has the pointing function for changing the monitoring direction.

Each artificial satellite 210 includes the monitoring control device 212.

The monitoring control device 212 directs the monitoring direction to the target area of the Earth by controlling the pointing function.

Each artificial satellite 210 includes the monitoring device 211 and the monitoring control device 212.

The monitoring device 211 has the resolution variable function.

The monitoring control device 212 adjusts the resolution of the monitoring device 211 by controlling the resolution variable function of the monitoring device 211.

Each artificial satellite 210 includes the monitoring device 211 and the monitoring control device 212.

The monitoring device 211 has an autofocus function.

The monitoring control device 212 sets a focal point of the monitoring device 211 to the target area by controlling the autofocus function of the monitoring device 211.

Each artificial satellite 210 includes the communication device 213 that communicates with the ground facility 300.

The communication device 213 has a dynamic range corresponding to change in the relative distance between the ground facility 300 and the artificial satellite 210.

Effect of First Embodiment

Since the three artificial satellites (210A to 210C) alternately stay in the vicinity of the apogee for a long time, it is possible to always monitor the target area. Further, since the three artificial satellites (210A to 210C) alternately pass in the vicinity of the perigee, it is possible to observe the target area with high resolution.

Second Embodiment

For a mode in which each long axis of three elliptical orbits of the satellite constellation 200 is tilted at equal intervals from each other in an elevation direction, mainly matters different from the first embodiment will be described with reference to FIGS. 13 to 20.

The elevation direction is equivalent to a latitude direction, that is, a north-south direction.

As described in the first embodiment, it is possible to find the sun-synchronous elliptical orbit for any number of circulations.

A sun-synchronous elliptical orbit for 14 rounds/day can be found by finely adjusting each of the apogee altitude at 1,500 kilometers and the perigee altitude at 300 kilometers.

The elliptical orbit for 14 rounds/day has the orbit inclination angle of about 98 degrees. For this reason, this elliptical orbit is suitable for monitoring the target area located at a latitude of plus or minus 82 degrees (=180-98).

Figure 13:
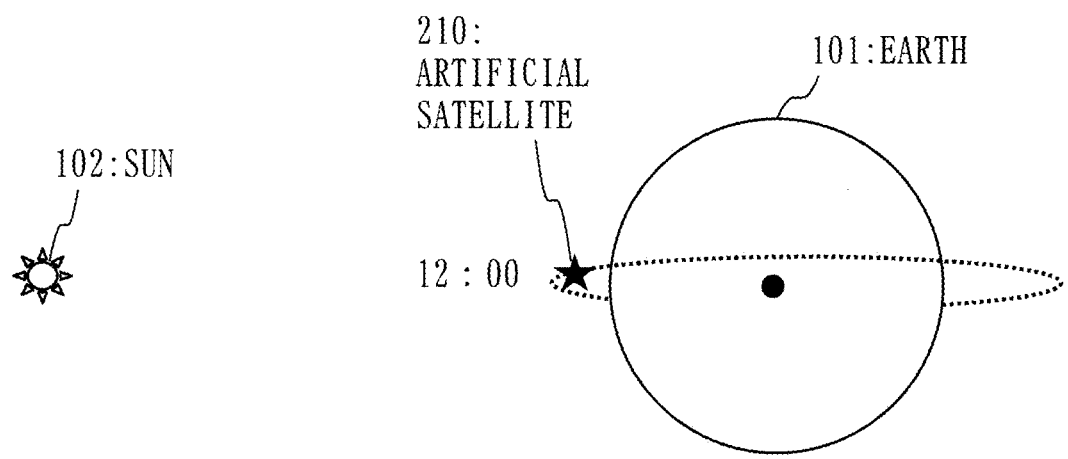
FIG. 13 is a diagram illustrating a sun-synchronous elliptical polar orbit of an artificial satellite 210 according to a second embodiment.
Figure 14:
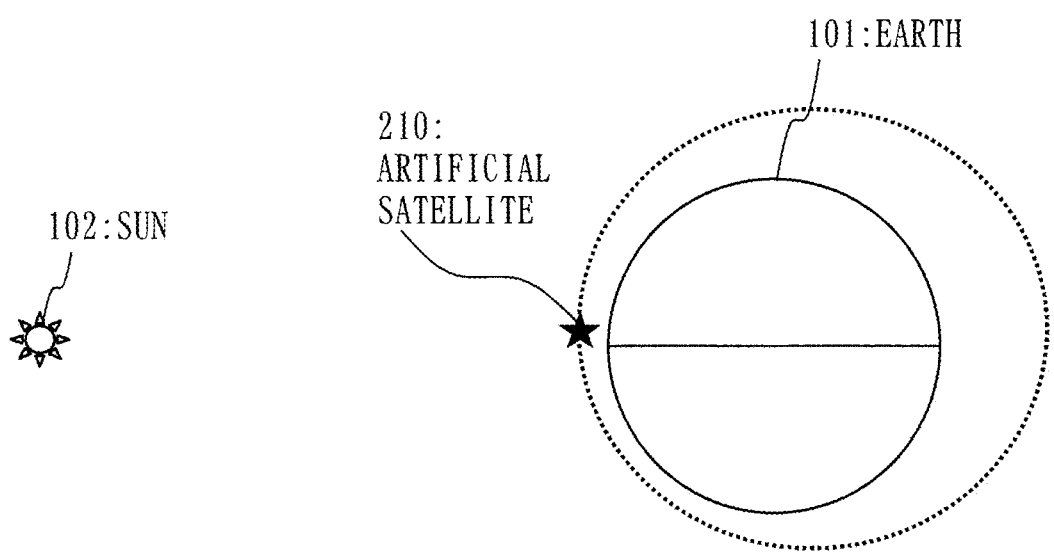
FIG. 14 is a diagram illustrating the sun-synchronous elliptical polar orbit of the artificial satellite 210 according to the second embodiment.

FIGS. 13 and 14 illustrate a sun-synchronous elliptical polar orbit.

FIG. 13 illustrates an elliptical polar orbit when viewed from the sky above the North Pole. A black circle depicted in the Earth 101 represents the North Pole. In the following diagrams, the black circle depicted in the Earth 101 represents the North Pole.

FIG. 14 illustrates the elliptical polar orbit when viewed from the sky above the equator. A line depicted in the Earth 101 represents the equator. In the following diagrams, the line depicted in the Earth 101 represents the equator.

In the sun-synchronous elliptical polar orbit, the northernmost end of the orbit surface crosses directly below the Sun 102 at 12:00 μm.

A specific example of the sun-synchronous elliptical polar orbit is an elliptical orbit whose LST on the orbit surface is 12:00 pm. LST is an abbreviation for Local Sun Time.

The elliptical orbit for 14 rounds/day is an orbit similar to a so-called polar orbit since the elliptical orbit for 14 rounds/day has the orbit inclination angle of about 98 degrees. That is, the elliptical orbit for 14 rounds/day is similar to the elliptical polar orbits illustrated in FIGS. 13 and 14.

First Examples

Figure 15:
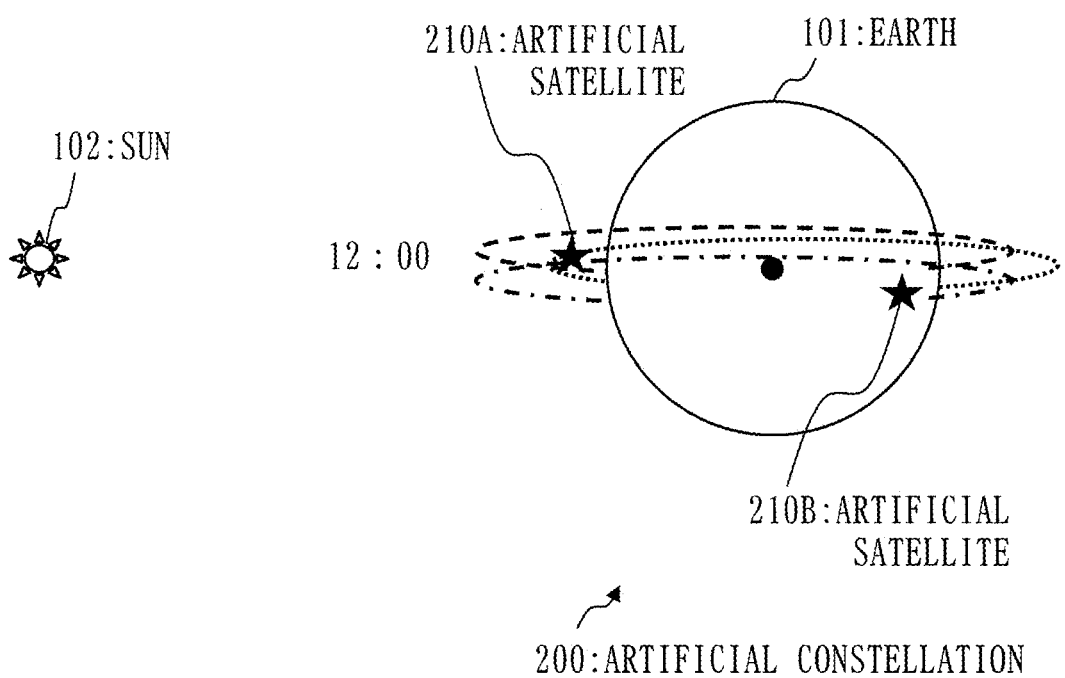
FIG. 15 is a diagram illustrating first examples of a satellite constellation 200 according to the second embodiment.
Figure 16:
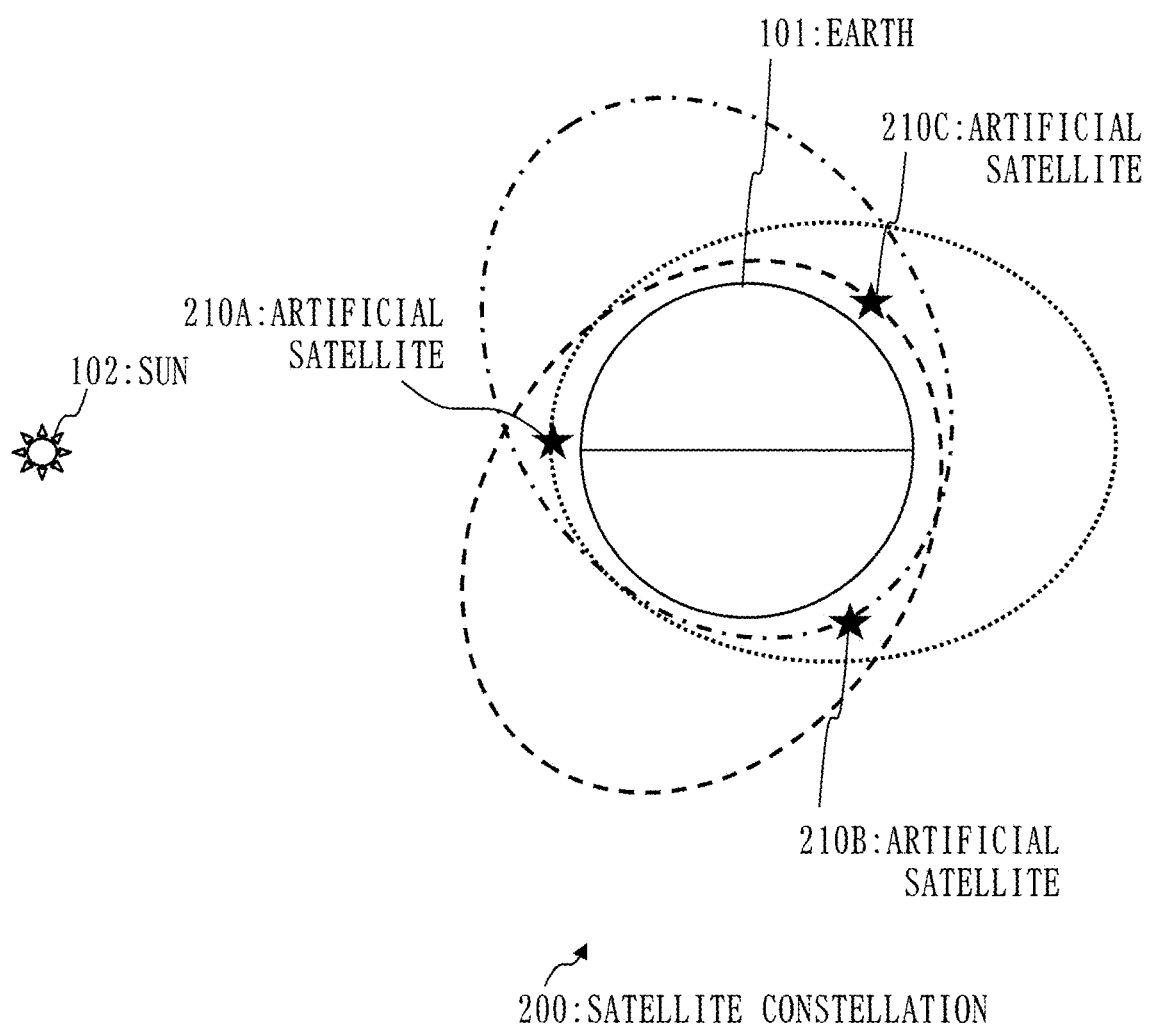
FIG. 16 is a diagram illustrating the first examples of the satellite constellation 200 according to the second embodiment.

FIGS. 15 and 16 illustrate the satellite constellations 200 in which each artificial satellite (210A to 210C) circulates on the elliptical orbit with LST 12:00.

The elliptical orbit with LST 12:00 is an elliptical orbit whose LST on the orbit surface is 12:00 pm (see FIG. 15).

The satellite constellation 200 is constituted of the three artificial satellites (210A to 210C), and each artificial satellite (210A to 210C) circulates on the elliptical orbit. Each long axis of the three elliptical orbits is tilted evenly by 120 degrees from each other in an elevation direction (latitude direction, north-south direction) (see FIG. 16). Consequently, the artificial satellite 210 that monitors from a perigee side and the artificial satellite 210 that monitors from an apogee side alternately fly in the sky above the target area of the Earth 101.

Each artificial satellite (210A to 210C) circulates one round in about 100 minutes. That is, each artificial satellite (210A to 210C) revisits in the sky above the target area once every about 100 minutes. For this reason, each artificial satellite (210A to 210C) may be able to monitor the target area a plurality of times during a sunshine time range.

In the elliptical orbit with LST 12:00, 12:00 pm is basically an optimum monitoring time.

Before and after 12:00 pm, there are monitoring opportunities at around 10:20 and around 13:40. However, since the long axis of the elliptical orbit circles, the target area is viewed from an angle in the monitoring opportunities before and after 12:00 pm, and the monitoring condition is deteriorated.

For this reason, it is effective to shift the time range in which the three artificial satellites (210A to 210C) fly in the sky above the target area, by changing the LSTs of the three elliptical orbits.

Second Examples

Figure 17:
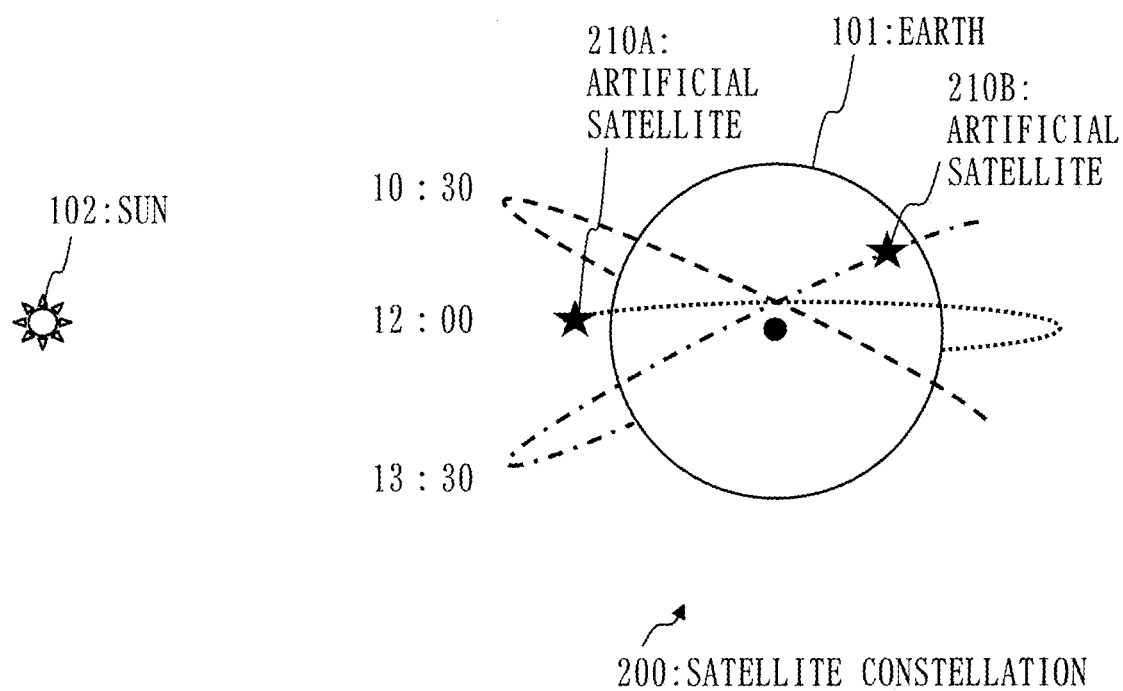
FIG. 17 is a diagram illustrating second examples of the satellite constellation 200 according to the second embodiment.
Figure 18:
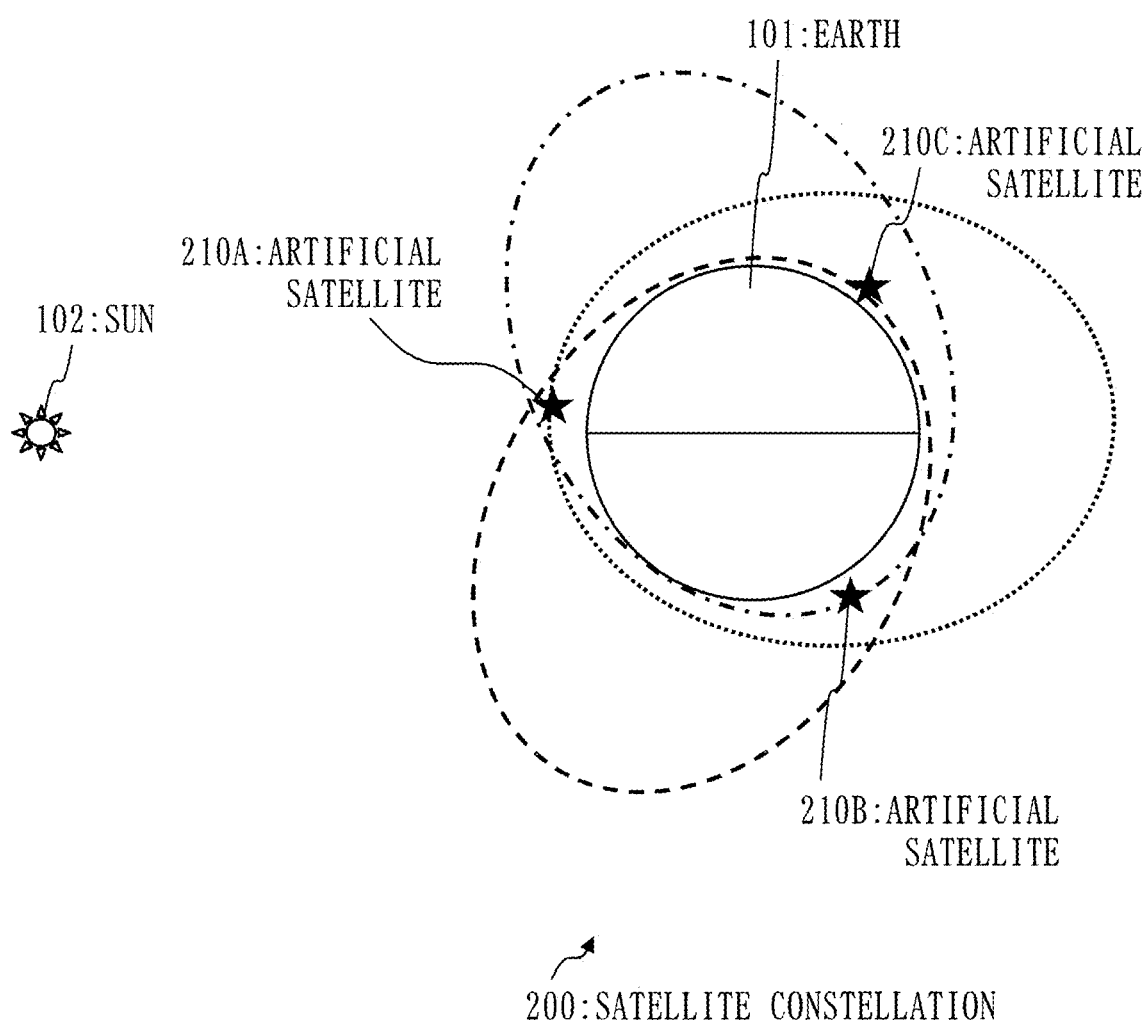
FIG. 18 is a diagram illustrating the second examples of the satellite constellation 200 according to the second embodiment.

FIGS. 17 and 18 illustrate the satellite constellation 200 in which each artificial satellite (210A to 210C) circulates on the elliptical orbits whose LST times are different from each other.

The artificial satellite 210A circulates on the elliptical orbit with LST 12:00.

The artificial satellite 210B circulates on an elliptical orbit with LST 13:30. The elliptical orbit with LST 13:30 is an elliptical orbit whose LST on the orbit surface is 13:30.

The artificial satellite 210C circulates on an elliptical orbit with LST 10:30. The elliptical orbit with LST 10:30 is an elliptical orbit whose LST on the orbit surface is 10:30.

By making the long axis of the elliptical orbit with LST 12:00, circle in an azimuth direction (longitude direction, east-west direction) by plus or minus 22.5 degrees, the elliptical orbit with LST 10:30 and the elliptical orbit with LST 13:30 are formed (See FIG. 17).

Each long axis of the three elliptical orbits is evenly tilted by 120 degrees from each other in an elevation direction (latitude direction, north-south direction) (see FIG. 18).

Consequently, the artificial satellite 210 which monitors from the perigee side and the artificial satellite 210 which monitors from the apogee side alternately fly directly above the target area of the Earth 101.

For this reason, when monitoring opportunities before and after each LST are included, it is possible to intermittently monitor the target area approximately between 9:00 and 15:00.

Since the ground speed of each artificial satellite (210A to 210C) is fast, constantly monitoring for a long time is not possible. However, since the number of circulations in a day by each artificial satellite (210A to 210C) is large, it is possible to have an opportunity to monitor the target area about 9 to 12 times by the three artificial satellites (210A to 210C).

Third Examples

Figure 19:
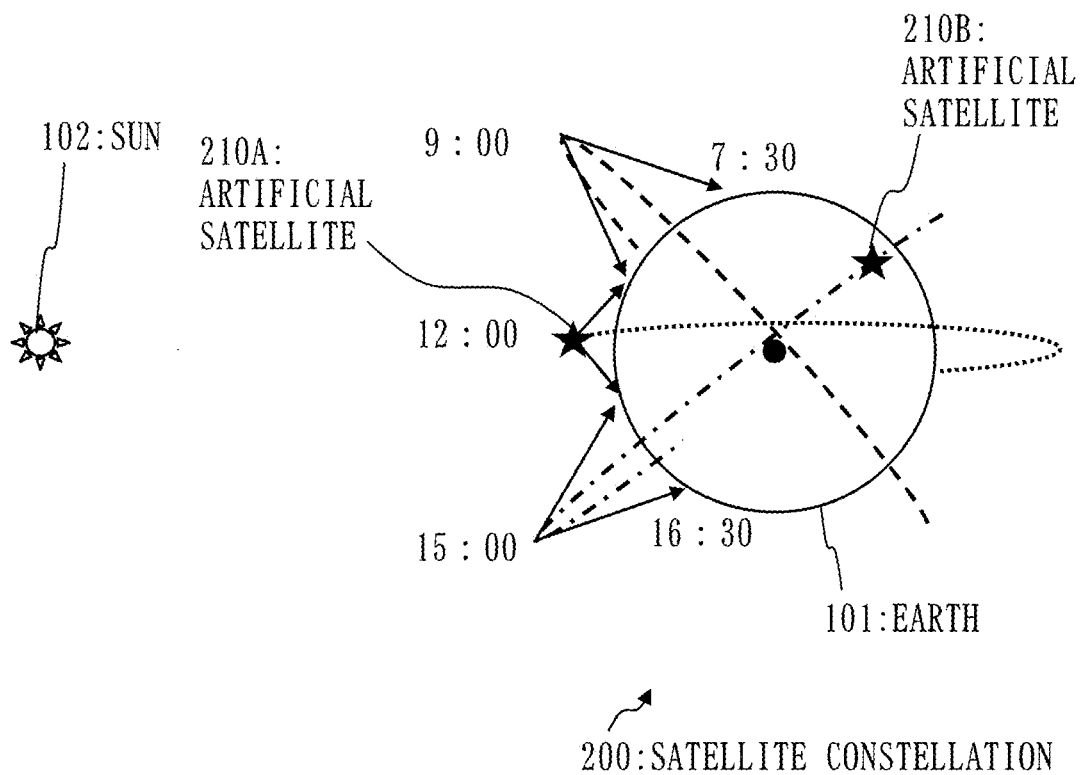
FIG. 19 is a diagram illustrating third examples of the satellite constellation 200 according to the second embodiment.
Figure 20:
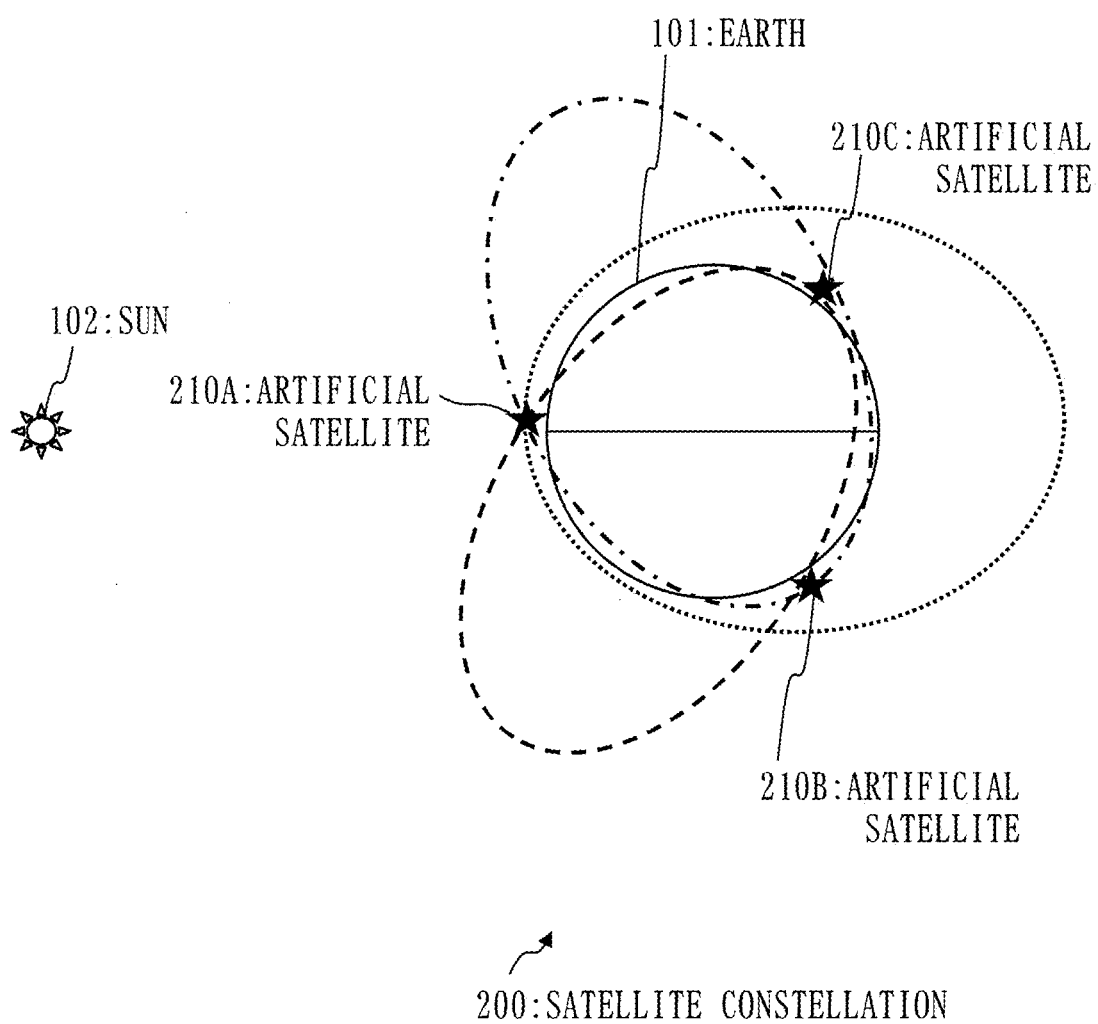
FIG. 20 is a diagram illustrating the third examples of the satellite constellation 200 according to the second embodiment.

FIGS. 19 and 20 illustrate the satellite constellation 200 including the artificial satellites (210A to 210C) each of which circulates on the elliptical orbits whose LST times are different from each other.

The artificial satellite 210A circulates on the elliptical orbit with LST 12:00.

The artificial satellite 210B circulates on an elliptical orbit with LST 15:00. The elliptical orbit with LST 15:00 is an elliptical orbit whose LST on the orbit surface is 15:00.

The artificial satellite 210C circulates on an elliptical orbit with LST 9:00. The elliptical orbit with LST 9:00 is an elliptical orbit whose LST on the orbit surface is 9:00.

By making the long axis of the elliptical orbit with LST 12:00, circle in an azimuth direction (longitude direction, east-west direction) by plus or minus 45 degrees, the elliptical orbit with LST 9:00 and the elliptical orbit with LST 15:00 are formed (see FIG. 19).

Each long axis of the three elliptical orbits is evenly tilted by 120 degrees from each other in an elevation direction (latitude direction, north-south direction) (see FIG. 20).

Consequently, the artificial satellite 210 which monitors from the perigee side and the artificial satellite 210 which monitors from the apogee side alternately fly directly above the target area of the Earth 101.

For this reason, when the monitoring opportunities before and after each LST are included, it is possible to intermittently monitor the target area approximately between 7:30 to 16:30.

By the three artificial satellites (210A to 210C), it is possible to monitor with high resolution during all time ranges in a daytime but intermittently.

Characteristics of Second Embodiment

Main characteristics of the second embodiment will be described.

The satellite constellation 200 includes three or more artificial satellites 210 which monitor the target area of the Earth.

At least one of the three or more artificial satellites 210 circulates on the orbit on which the northernmost end of the orbit surface crosses directly below the Sun at 12:00 pm.

The orbit of each of the three or more artificial satellites 210 is the elliptical orbit having the sun-synchronization and the orbit inclination angle.

The long axis of each elliptical orbit forms an equal angle with each long axis of two adjacent elliptical orbits in the longitude direction.

At least one of the three or more artificial satellites 210 circulates on the orbit whose local sun time on the orbit surface is 12:00 pm.

The satellite constellation 200 includes three artificial satellites (210A to 210C).

One artificial satellite 210A circulates on a first elliptical orbit. The northernmost end of the orbit surface of the first elliptical orbit crosses directly below the Sun at 12:00 pm.

One (210B) of two artificial satellites circulates on a second elliptical orbit. The long axis of the second elliptical orbit forms a defined angle with the long axis of the first elliptical orbit on a plus side of the latitude direction.

The other one (210C) of the two artificial satellites circulates on a third elliptical orbit. The long axis of the third elliptical orbit forms a defined angle with the long axis of the first elliptical orbit on a minus side of the latitude direction.

The defined angle is an angle of 45 degrees or smaller.

Effect of Second Embodiment

Even if the elliptical orbit of the artificial satellite 210A is an orbit similar to a so-called polar orbit, the same effect as that in the first embodiment can be obtained.

Third Embodiment

As to running of the satellite constellation 200, mainly matters different from the first embodiment and the second embodiment will be described.

In order to verify feasibility of the satellite constellation 200, one artificial satellite 210 is manufactured (developed), and one manufactured (developed) artificial satellite 210 is put into an orbit. The ground facility 300 controls the one artificial satellite 210.

Then, after the feasibility of the satellite constellation 200 is verified, the satellite constellation 200 by the three artificial satellites 210 is run. The ground facility 300 controls the three artificial satellites 210.

During preparation of the satellite constellation 200, one or two artificial satellites 210 may be prepared in advance. The ground facility 300 controls the one or two artificial satellites 210.

Supplement to Embodiments

The embodiments are examples of preferred modes, and are not intended to limit the technical scope of the present invention. The embodiments may be implemented partially or may be implemented being combined with other modes.

REFERENCE SIGNS LIST

100: monitoring system, 101: Earth, 102: sun, 103: orbit surface, 200: satellite constellation, 210: artificial satellite, 211: monitoring device, 212: monitoring control device, 213: communication device, 214: propulsion device, 215: attitude control device, 216: power supply device, 300: ground facility, 310: satellite control device, 320: satellite communication device.

The invention claimed is:

1. A satellite constellation comprising:
three or more artificial satellites that monitor a target area of the Earth,
wherein each of the three or more artificial satellites circulates on non-frozen elliptical orbits having sun-synchronization and an orbit inclination angle,
wherein a long axis of each elliptical orbit forms an equal angle with each long axis of two adjacent elliptical orbits on an orbit surface, and
wherein a position of each of the three or more artificial satellites is configured to be adjusted on a corresponding elliptical orbit according to control commands received by each of the three or more satellites so that each of the three or more artificial satellites cooperate with each other to constantly monitor the target area of the Earth.

2. A ground facility, which is for controlling the satellite constellation according to claim 1, comprising:
a satellite control device to generate for each artificial satellite of the satellite constellation, adjustment commands which are for adjusting an altitude of the artificial satellite and the orbit inclination angle of the elliptical orbit of the artificial satellite; and
a satellite communication device to transmit for each artificial satellite of the satellite constellation, the adjustment commands to the artificial satellite, and
wherein by adjusting for each artificial satellite of the satellite constellation, the altitude of the artificial satellite and the orbit inclination angle of the elliptical orbit of the artificial satellite according to the adjustment commands, the sun-synchronization of the elliptical orbit of the artificial satellite is maintained, and relative angles between a long axis of the elliptical orbit of the artificial satellite and long axes of elliptical orbits of other artificial satellites in the satellite constellation are maintained.

3. The ground facility according to claim 2,
wherein the satellite control device generates for each artificial satellite of the satellite constellation, a control command which is for controlling a propulsion device of the artificial satellite for adjusting a position of the artificial satellite on the elliptical orbit of the artificial satellite,
wherein the satellite communication device transmits for each artificial satellite of the satellite constellation, the control command to the artificial satellite,
wherein by adjusting the position of the artificial satellite on the elliptical orbit of the artificial satellite according to the control command for each artificial satellite of the satellite constellation, the artificial satellite cooperates with other artificial satellites in the satellite constellation to constantly monitor the target area, and
wherein the adjustment commands are executed for each artificial satellite of the satellite constellation, after the control command is executed.

4. The ground facility according to claim 2,
wherein the satellite control device generates for each artificial satellite of the satellite constellation, a control command which is for controlling a propulsion device of the artificial satellite for adjusting speed of the artificial satellite,
wherein the satellite communication device transmits for each artificial satellite of the satellite constellation, the control command to the artificial satellite,
wherein by adjusting the speed of the artificial satellite according to the control command for each artificial satellite of the satellite constellation, a relative position of the artificial satellite towards the target area of the Earth is adjusted during a target time range assigned to the artificial satellite, and
wherein the adjustment commands are executed for each artificial satellite of the satellite constellation, after the control command is executed.

5. A ground facility, which is for controlling the satellite constellation according to claim 1,
wherein each artificial satellite of the satellite constellation has a pointing function which is for changing a monitoring direction,
the ground facility comprising:
a satellite control device to generate for each artificial satellite of the satellite constellation, a pointing command which is for controlling the pointing function of the artificial satellite; and a satellite communication device to transmit for each artificial satellite of the satellite constellation, the pointing command to the artificial satellite, and wherein by controlling for each artificial satellite of the satellite constellation, the pointing function of the artificial satellite according to the pointing command, the monitoring direction of the artificial satellite is directed to the target area of the Earth during a target time range assigned to the artificial satellite.

6. An artificial satellite, which is used in the satellite constellation according to claim 1, comprising:
a pointing function for changing a monitoring direction; and
a monitoring control device to direct the monitoring direction to the target area of the Earth by controlling the pointing function.

7. An artificial satellite, which is used in the satellite constellation according to claim 1, comprising:
a monitoring device having a resolution variable function; and
a monitoring control device to adjust resolution of the monitoring device by controlling the resolution variable function of the monitoring device.

8. An artificial satellite, which is used in the satellite constellation according to claim 1, comprising:
a monitoring device having an autofocus function; and
a monitoring control device to set a focal point of the monitoring device to the target area by controlling the autofocus function of the monitoring device.

9. An artificial satellite, which is used in the satellite constellation according to claim 1, comprising a communication device to communicate with a ground facility which is for controlling the satellite constellation, and
wherein the communication device has a dynamic range corresponding to a change in a relative distance between the ground facility and the artificial satellite.

10. A satellite constellation comprising:
three or more artificial satellites which monitor a target area of the Earth,
wherein at least one of the three or more artificial satellites circulates on an orbit whose northernmost end on an orbit surface crosses directly below the Sun at 12:00 pm,
wherein the orbit of each of the three or more artificial satellites is a non-frozen elliptical orbit having sun-synchronization and an orbit inclination angle,
wherein a long axis of each elliptical orbit forms an equal angle with each long axis of two adjacent elliptical orbits, and
wherein a position of each of the three or more artificial satellites is configured to be adjusted on a corresponding elliptical orbit according to a control command received from a ground facility so that each of the three or more artificial satellites cooperate with each other to constantly monitor the target area of the Earth.

11. A satellite constellation comprising:
three or more artificial satellites which monitor a target area of the Earth,
wherein an orbit of each of the three or more artificial satellites is a non-frozen elliptical orbit having sun-synchronization and an orbit inclination angle,
wherein a long axis of each elliptical orbit forms an equal angle with each long axis of two adjacent elliptical orbits,
wherein at least one of the three or more artificial satellites circulates on an orbit whose local sun time on an orbit surface is 12:00 pm, and wherein a position of each of the three or more artificial satellites is configured to be adjusted on a corresponding elliptical orbit according to a control command received from a ground facility so that each of the three or more artificial satellites cooperate with each other to constantly monitor the target area of the Earth.

12. The satellite constellation according to claim 10, comprising three artificial satellites,
wherein one artificial satellite circulates on a first elliptical orbit, and a northernmost end of an orbit surface of the first elliptical orbit crosses directly below the Sun at 12:00 pm,
wherein a first of two artificial satellites circulates on a second elliptical orbit, and a long axis of the second elliptical orbit forms a defined angle with a long axis of the first elliptical orbit on a plus side of a latitude direction,
wherein a second of the two artificial satellites circulates on a third elliptical orbit, and a long axis of the third elliptical orbit forms the defined angle with the long axis of the first elliptical orbit on a minus side of a latitude direction, and
wherein the defined angle is an angle of 45 degrees or smaller.

13. The satellite constellation according to claim 11, comprising three artificial satellites,
wherein one artificial satellite circulates on a first elliptical orbit, and a northernmost end of an orbit surface of the first elliptical orbit crosses directly below the Sun at 12:00 pm,
wherein a first of two artificial satellites circulates on a second elliptical orbit, and a long axis of the second elliptical orbit forms a defined angle with a long axis of the first elliptical orbit on a plus side of a latitude direction,
wherein a second of the two artificial satellites circulates on a third elliptical orbit, and a long axis of the third elliptical orbit forms the defined angle with the long axis of the first elliptical orbit on a minus side of a latitude direction, and
wherein the defined angle is an angle of 45 degrees or smaller.

14. An artificial satellite included in the satellite constellation according to claim 1, to be put into an orbit.

15. A ground facility, which is for controlling the satellite constellation comprising the artificial satellite according to claim 14.

16. An artificial satellite included in the satellite constellation according to claim 10, to be put into an orbit.

17. A ground facility, which is for controlling the satellite constellation comprising the artificial satellite according to claim 16.

18. An artificial satellite included in the satellite constellation according to claim 11, to be put into an orbit.

19. A ground facility, which is for controlling the satellite constellation comprising the artificial satellite according to claim 18.

20. The satellite constellation according to claim 1, wherein the three or more artificial satellites are configured to monitor the target area of the Earth using a visible light optical sensor.

21. The satellite constellation according to claim 10, wherein the three or more artificial satellites are configured to monitor the target area of the Earth using a visible light optical sensor.

22. The satellite constellation according to claim 11, wherein the three or more artificial satellites are configured to monitor the target area of the Earth using a visible light optical sensor.

* * * * *